(12) United States Patent
Pereira et al.

(10) Patent No.: US 10,033,421 B2
(45) Date of Patent: Jul. 24, 2018

(54) MULTI-STANDARD, MULTI-CHANNEL EXPANDABLE TV/SATELLITE RECEIVER

(71) Applicant: Silicon Laboratories Inc., Austin, TX (US)

(72) Inventors: Vitor Pereira, Austin, TX (US); Mustafa Koroglu, Austin, TX (US); Ruifeng Sun, Charlottesville, VA (US); Ramin Khoini-Poorfard, Austin, TX (US); Abdulkerim Coban, Austin, TX (US); Yu Su, Austin, TX (US); Krishna Pentakota, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/168,318

(22) Filed: May 31, 2016

(65) Prior Publication Data

US 2017/0346520 A1    Nov. 30, 2017

(51) Int. Cl.
*H04B 1/30* (2006.01)
*H04B 1/00* (2006.01)
*H04B 1/10* (2006.01)

(52) U.S. Cl.
CPC .............. *H04B 1/30* (2013.01); *H04B 1/0028* (2013.01); *H04B 1/1027* (2013.01)

(58) Field of Classification Search
CPC ....... H04B 1/30; H04B 1/0028; H04B 1/1027
See application file for complete search history.

(56) References Cited

U.S. PATENT DOCUMENTS

| 8,346,202 | B2* | 1/2013 | Coban ................. H04L 25/06 348/725 |
| 8,599,312 | B2 | 12/2013 | Hendrickson et al. |
| 8,885,106 | B2* | 11/2014 | Koroglu ............. H04N 5/4401 348/555 |
| 8,928,820 | B2 | 1/2015 | Coban et al. |
| 9,258,596 | B2 | 2/2016 | Pereira et al. |
| 2011/0242428 | A1* | 10/2011 | Blouin ................ H04L 1/0047 348/726 |
| 2012/0113324 | A1* | 5/2012 | Yoshida ................ H04B 1/18 348/555 |
| 2015/0085195 | A1* | 3/2015 | Pereira .................. H01L 25/00 348/726 |
| 2015/0126128 | A1 | 5/2015 | Youngblood et al. |
| 2017/0024183 | A1* | 1/2017 | Li .......................... H04H 20/22 |
| 2017/0238049 | A1* | 8/2017 | Ramesh ............ H04N 21/4383 725/126 |

* cited by examiner

*Primary Examiner* — Freshteh N Aghdam
(74) *Attorney, Agent, or Firm* — Trop, Pruner & Hu, P.C.

(57) ABSTRACT

In one example, a semiconductor die includes multi-standard, multi-channel expandable television/satellite receiver that can be flexibly implemented in a number of different configurations to enable incorporation into a plurality of different systems. The semiconductor die may include multiple tuners to receive and tune a terrestrial radio frequency (RF) signal and a satellite RF signal. These tuners may include different frequency synthesizers including voltage controlled oscillators (VCOs) to generate VCO signals at different frequencies, mixers to downconvert the RF signals to baseband signals using the VCO signals. In an implementation, the semiconductor die may further include shared circuitry coupled to the tuners to digitize, process and demodulate the baseband signals.

19 Claims, 7 Drawing Sheets

MULTI-STANDARD, MULTI-CHANNEL EXPANDABLE TV/SATELLITE RECEIVER

BACKGROUND

In many entertainment systems, there is a desire to provide for flexibility of sources, such that radio and television channels can be received from a wide variety of different sources, including cable, satellite and terrestrial, among other sources. However, providing discrete receivers for different sources and modes of operation can undesirably increase costs. While known receivers can provide for reception of more than one band, many complexities exist, and full flexibility is not realized.

SUMMARY OF THE INVENTION

In one aspect, an apparatus formed having a semiconductor die includes a first tuner to receive and tune a terrestrial radio frequency (RF) signal. This first tuner may include a first frequency synthesizer including a first voltage controlled oscillator (VCO) to generate a first VCO signal at a first frequency, and a first mixer to downconvert the terrestrial RF signal to a terrestrial baseband signal using the first VCO signal. The semiconductor die may further include a second tuner to receive and tune a satellite RF signal. This second tuner may include a second frequency synthesizer including a second VCO to generate a second VCO signal at a second frequency, and a second mixer to downconvert the satellite RF signal to a satellite baseband signal using the second VCO signal. In an implementation, the semiconductor die may further include a digitizer coupled to the first and second tuners to digitize the terrestrial baseband signal and the satellite baseband signal, a digital signal processor (DSP) to further process the terrestrial baseband signal and the satellite baseband signal, a first demodulator to demodulate the terrestrial baseband signal and output a demodulated terrestrial signal, and a second demodulator to demodulate the satellite baseband signal and output a demodulated satellite signal.

In an implementation, the apparatus may further include a third demodulator to demodulate a baseband FM signal, the baseband FM signal generated by one of the first and second tuners. The first tuner may include a first low noise amplifier (LNA) to receive and amplify the terrestrial RF signal and a second LNA to receive and amplify a second terrestrial RF signal. The apparatus may further include an active splitter to receive the second terrestrial RF signal and provide the second terrestrial RF signal to the second LNA and to at least one buffer to output the second terrestrial RF signal from the semiconductor die. This at least one buffer may include a first buffer and a second buffer, where the second buffer comprises a loop through buffer to output the second terrestrial RF signal to a second semiconductor die coupled to the first semiconductor die.

In an implementation, a configurable LNA may be controllable to be the first LNA in a first mode of operation and to be the second LNA in a second mode of operation. The first LNA may be a common gate amplifier and the second LNA may be a common source amplifier. The configurable LNA may include a plurality of slices each individually controllable to provide an output to one of a plurality of filters coupled to the first mixer or to a dump node. In an example, a first slice may include: a first amplifier pair controllable to operate in a selected one of a common gate mode and a common source mode; a plurality of cascode pairs, where one of the plurality of cascode pairs is to be coupled to the first amplifier pair to direct an amplified output of the first amplifier pair to a selected destination corresponding to one of the plurality of filters or the dump node; and at least second and third amplifier pairs controllable to operate in the common gate mode.

In an implementation, the second tuner may include a first LNA to receive and amplify the satellite RF signal and a second LNA to receive and amplify a second satellite RF signal. The apparatus may further include a microcontroller, where in a first mode the microcontroller is to cause the satellite RF signal to couple to the first and second LNAs. The apparatus may further include a bypass path to provide at least one of the modulated terrestrial baseband signal and the modulated satellite baseband signal from the DSP to an output pad of the semiconductor die.

In an implementation, the first VCO includes a first plurality of interpolative dividers to receive the first VCO signal and generate a plurality of local oscillator (LO) clock signals including a first LO clock signal therefrom, and the second VCO includes comprises a second plurality of interpolative dividers to receive the second VCO signal and generate a second LO clock signal therefrom, the first mixer to receive the first LO clock signal and the second mixer to receive the second LO clock signal. In one example implementation, the apparatus may be an integrated circuit including the semiconductor die and a second semiconductor die stacked above the semiconductor die without shielding therebetween. This second semiconductor die may include a third tuner, a fourth tuner, and a second DSP and at least one demodulator.

In another aspect, an apparatus may be formed with a first semiconductor die and a second semiconductor die stacked above the first semiconductor die. The first semiconductor die may include: a first terrestrial tuner to receive and tune a terrestrial RF signal, where the first terrestrial tuner includes a first frequency synthesizer including a first VCO to generate a first VCO signal at a first frequency, and a first mixer to downconvert the terrestrial RF signal to a terrestrial baseband signal using the first VCO signal; a first satellite tuner to receive and tune a selected one of a satellite RF signal and a second satellite RF signal, the first satellite tuner including a second frequency synthesizer including a second VCO to generate a second VCO signal at a second frequency substantially separated from the first frequency, and a second mixer to downconvert a selected one of the satellite RF signal and the second satellite RF signal to a satellite baseband signal using the second VCO signal. The first semiconductor die may further include: a digitizer coupled to the first terrestrial tuner and the first satellite tuner to digitize the terrestrial baseband signal and the satellite baseband signal; a DSP to further process the terrestrial baseband signal and the satellite baseband signal; a first analog demodulator to demodulate the terrestrial baseband signal and output a first demodulated terrestrial signal; a first digital demodulator to demodulate the terrestrial baseband signal and output a second demodulated terrestrial signal, when the terrestrial baseband signal comprises a digital modulated signal, and to demodulate the satellite baseband signal and output a first demodulated satellite signal In turn, the second semiconductor die may include: a second terrestrial tuner to receive and tune the terrestrial RF signal, where the second terrestrial tuner is to receive the terrestrial RF signal from the first terrestrial tuner of the first semiconductor die; a second satellite tuner to receive and tune a selected one of the satellite RF signal and the second satellite RF signal; a second digitizer coupled to the second terrestrial tuner and the second satellite tuner to digitize a terrestrial baseband signal and a satellite baseband signal; and a second DSP to further process the terrestrial baseband signal and the satellite baseband signal.

In an example, the apparatus may further include a controller to cause the first terrestrial tuner to receive and tune to a first channel within the terrestrial RF signal and concurrently cause the second terrestrial tuner to receive and tune to a second channel within the terrestrial RF signal. The controller may cause a first amplifier of the first satellite tuner to be enabled to receive and amplify the satellite RF signal and cause a second amplifier of the first satellite tuner to be disabled, and to cause the first terrestrial tuner to be disabled while the first satellite tuner is enabled.

In yet another aspect, a computer-readable medium includes instructions that when executed enable a system to perform operations comprising: receiving a first command from a host controller in a controller of a receiver, the first command to request activation of a first terrestrial tuner of the receiver; enabling the first terrestrial tuner and disabling a first satellite tuner of the receiver, the first terrestrial tuner and the first satellite tuner formed on a first semiconductor die, the first terrestrial tuner having a first frequency synthesizer to operate at a first fixed frequency and the first satellite tuner having a second frequency synthesizer to operate at a second fixed frequency; configuring the first terrestrial tuner to receive and process a first terrestrial RF signal of a first channel in the first terrestrial tuner; configuring a first demodulator of the receiver to demodulate a first terrestrial baseband signal obtained from the first terrestrial RF signal, the first demodulator formed on the first semiconductor die; and configuring a selection circuit of the receiver to output the first terrestrial demodulated signal from the receiver.

In an example, the computer-readable medium further includes instructions that when executed enable the system to perform operations comprising: configuring an amplifier of the first terrestrial tuner as a common gate amplifier when the first terrestrial RF signal is received via a first input pad; and configuring the amplifier of the first terrestrial tuner as a common source amplifier when the first terrestrial RF signal is received via a second input pad, the second input pad coupled to an active splitter, where an output of the active splitter is coupled to an input of the amplifier, the output of the active splitter further to provide the first terrestrial RF signal from a first output pad to couple to a different terrestrial tuner. The computer-readable medium may further include instructions that when executed enable the system to perform operations comprising: receiving a second command from the host controller in the controller, the second command to request activation of the first satellite tuner of the receiver; enabling the first satellite tuner and disabling the first terrestrial tuner; configuring a first amplifier of the first satellite tuner to receive a first satellite RF signal in a first mode; and configuring the first amplifier and a second amplifier of the first satellite tuner to receive the first satellite RF signal in a second mode.

DETAILED DESCRIPTION

In various embodiments, a multi-channel receiver is provided. Such receiver may be used to flexibly receive incoming signals from a wide variety of different sources and different bands of operation. To this end, a receiver can be dynamically controlled, e.g., by an internal controller, to operate in one or more concurrent modes of operation. Such control may be based on instructions provided by a host processor of a given entertainment system. As will be described herein, embodiments provide a receiver architecture that can flexibly address different market solutions in different geographical locations, as well as different segments of the same market, via a single solution. To this end, a multi-standard multi-channel expandable television/satellite/radio receiver is provided. Such receiver can be implemented on one or more semiconductor die that can be adapted in a particular package for incorporation into a wide variety of end systems.

Figure 1:
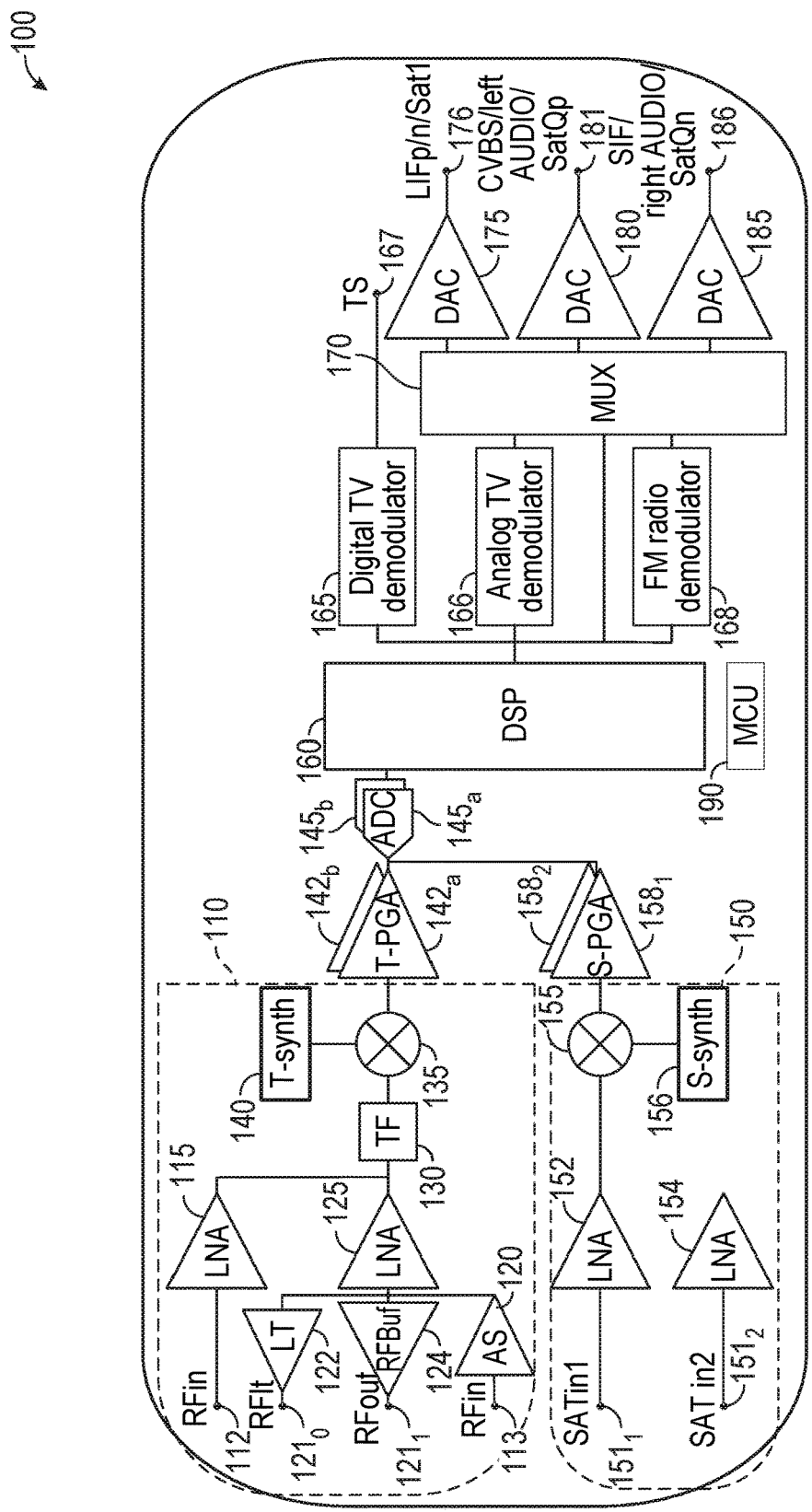
FIG. 1 is a block diagram of a multi-standard terrestrial/satellite television (TV) receiver in accordance with an embodiment.

Referring to FIG. 1, shown is a block diagram of a multi-standard terrestrial (including cable)/satellite television (TV) receiver in accordance with an embodiment. In the embodiment shown in FIG. 1, receiver 100 may be implemented on a single semiconductor die, although embodiments are not so limited. More specifically, in one implementation receiver 100 may be an integrated circuit formed using a single semiconductor die that is integrated into a given semiconductor package as desired for a particular application.

With reference to FIG. 1, receiver 100 includes multiple tuners, namely a terrestrial tuner 110 and a satellite tuner 150. Such tuners may be configured to receive incoming radio frequency (RF) signals of a given band and perform analog front end processing, including gain control, filtering, downconversion and so forth, to provide a downconverted signal to a remainder of a signal processing path of receiver 100.

Specifically with reference to terrestrial tuner 110, an incoming RF signal may be received from a selected one of multiple input paths. For example, an incoming RF signal as received by an antenna and coupled to receiver 100, e.g., via a coaxial cable, may be provided directly to a first low noise amplifier (LNA) 115, via a first RF input pad 112. As described herein, in an embodiment LNA 115 may be configured as a common gate LNA that provides a low input impedance LNA architecture.

In other cases, an incoming RF signal may be received via another input pad 113, which in turn is coupled to an active splitter 120. Active splitter 120 may be configured to provide appropriate impedance matching and buffering to output the received RF signal to multiple destinations, including a second LNA 125 and multiple buffers. In an embodiment, active splitter 120 may be implemented as a common gate amplifier. In some implementations, RF sources may be coupled to both of input pads 112 and 113, and a given signal processing path may be enabled and the other signal processing path disabled, depending on desired channel and source.

In an embodiment, second LNA 125 may be configured as a common source LNA to provide a high input impedance LNA architecture. As will be described herein, although shown as two separate LNAs (115 and 125), in some implementations a single physical configurable LNA may be provided. Accordingly, based on which RF path is active, this single LNA may be dynamically controlled (e.g., by an on-die microcontroller or other control circuitry) to be configured to operate as a common source-based amplifier or common gate-based amplifier.

In embodiments, active splitter 120 may be configured as a wide band splitter to receive and handle a wide band signal (e.g., ranging from approximately 50 megahertz (MHz) to 1 gigahertz (GHz)). This is the case, as terrestrial RF signals may include multiple bands of interest, ranging from radio signals (e.g., FM signals), terrestrial TV signals and cable TV signals, among other RF signals. Further benefits are achieved by incorporating active splitter 120 on the same semiconductor die as the remainder of receiver 100, including control of output swing and better tradeoff between power consumption and output linearity. This is the case, as active splitter 120 may be incorporated within automatic gain control (AGC) control algorithms that control front end components so that its effects on gain can be considered and compensated.

Active splitter 120 couples to multiple buffers configured to enable loop through or output of the received RF signal to other locations. Specifically as shown in FIG. 1, these buffers include a loop through buffer 122 that couples to a first RF output pad 121$_0$ and an RF buffer 124 that couples to a second RF output pad 121$_1$. In an embodiment, loop through buffer 122 may be implemented as a source follower. Use of such output buffers is described further below.

Note that when receiver 100 is configured for single channel operation without the need for loop through, LNA 115 may be configured to receive and amplify the incoming RF signal. As such, the noise contribution and power dissipation of active splitter 120, buffers 122 and 124, and second LNA 125 can be avoided.

To this end, to dynamically (or statically) control configuration of receiver 100 depending upon mode of operation, a microcontroller 190 may be present on the single semiconductor die. While not shown for ease of illustration, understand that control signals may be routed from MCU 190 to the various components of receiver 100 to enable their dynamic configuration/reconfiguration depending upon mode of operation. Further, microcontroller 190 may include or may be coupled to a non-transitory storage medium that includes instructions that when executed enable appropriate control of various components of receiver 100 for a particular mode of operation. Also, while shown on the same semiconductor die in the embodiment of FIG. 1, in other implementations microcontroller 190 may be present on another semiconductor die or other component of a given system. Still further, understand that MCU 190 may operate under control of a host processor of a given system, such as a given set top box, TV or other device incorporating receiver 100. More specifically, such host processor may issue commands as to, e.g., desired band, channel, mode of operation, source, destination, or so forth. From these commands, MCU 190 may appropriately configure receiver 100.

From both of LNAs 115 and 125, the received RF signal is provided to a tracking filter 130 which may filter the signal appropriately, given a desired band of operation. In an embodiment, tracking filter 130 may be implemented as a tracking filter bank such as one or more tracking filters for a given band of interest. From tracking filter 130, the filtered RF signal is provided to a mixer 135. Mixer 135 is configured to downconvert the RF signal to a lower frequency signal. Depending upon implementation, this lower frequency signal may be a baseband signal (e.g., at low intermediate frequency (LIF) or zero intermediate frequency (ZIF)). To this end, mixer 135 operates to downconvert the incoming RF signal using a local oscillator (LO) clock signal (which may be a quadrature clock signal) received from a frequency synthesizer 140. In various embodiments, frequency synthesizer 140 may be implemented using a fixed frequency inductor-capacitor (LC) tank-based voltage controlled oscillator (VCO) and one or more frequency dividers to operate as a local oscillator to output a LO clock signal as a mixing signal for mixer 135. In various embodiments, such frequency dividers may be implemented as interpolative frequency dividers. In this way, noise concerns with regard to multiple frequency synthesizers operating on the same die (or on closely located separate die) can be avoided.

Note that the output from mixer 135 may be quadrature-based (I/Q) signals such that the downconverted signals are provided to multiple programmable gain amplifiers (PGAs) 142$a$-142$b$, where additional filtering and/or gain adjustment may be performed. Thereafter, the processed downconverted signals are provided to digitizers, namely analog-to-digital (ADCs) converters 145$a$-145$b$, where the downconverted signals are digitized. The resulting digital signals are provided to a digital signal processor (DSP) 160.

Note with reference to FIG. 1 that ADCs 145$a$, 145$b$ are shared between the outputs of tuners 110 and 150. These ADCs 145$a$, 145$b$, which are shared between the terrestrial and satellite signal paths, have programmable bandwidths and dynamic ranges sufficient to meet requirements for any given terrestrial/satellite/radio standard. In other instances, additional sharing of components between the signal processing paths of tuners 110 and 150 can be realized. For example, a single set of PGAs can be provided to share between the downconverted signals output by tuners 110 and 150. To this end, such baseband circuits can have appropriately programmable bandwidth and other specifications to handle the downconverted signals output by the different tuners.

Various signal processing, including channel filtering, additional gain control, noise shaping, image calibration, offset correction, or so forth, may be performed in DSP 160. After such digital processing, the digital signals, which at this point are still modulated signals, may be provided to one of multiple demodulators depending upon mode of operation. In other cases, such demodulators can be bypassed, and the digital signals can be output from receiver 100, e.g., for further processing in a separate, off-chip demodulator or other processor.

Otherwise when receiver 100 is configured to perform demodulation on-chip, the digital signals are demodulated in one of corresponding modulators 165, 166 and 168, depending upon the mode of operation. As illustrated, demodulator 165 is a digital TV demodulator. In various embodiments, demodulator 165 may be configured to handle various digital TV demodulation modes, e.g., any one of DVB-C/C2/T/T2/S/S2, ISDB-T, or any other known digital TV demodulator modes or others that become available. In turn, demodulator 166 may be configured as an analog TV demodulator to handle analog terrestrial or cable demodulations. Still further, a FM radio demodulator 168 is provided to perform demodulation of FM signals. That is, in various embodiments an incoming RF spectrum may include FM signals, which are similarly processed by tuner 110, and pass through ADCs 145 and DSP 160 to demodulator 168 for demodulation such that demodulated FM signals can be output.

As illustrated, digital demodulated signals output by demodulator 165 may be output via a transport stream pad 167. In various embodiments, transport stream pad 167 may couple (via various IC connections) to an external processor, such as an MPEG processor, which may perform MPEG decoding on the transport stream.

Still with reference to FIG. 1, a multiplexer 170 or other selection circuit is coupled to receive demodulated signals from demodulators 166 and 168. Furthermore, as described herein, modulated signals output from DSP 160 may directly be coupled to multiplexer 170. As such, depending upon mode of operation, multiplexer 170 may control output of signals via one of multiple output paths. As illustrated, the various signals can be output via a set of digital-to-analog converters (DACs) 175, 180 and 185. As illustrated, each of these DACs may couple to a corresponding output pad 176, 181, and 186. As illustrated, LIFp/n/Sat1 signals can be output via output pad 176. In turn, CVBS/Left Audio/SatQp signals may be output via output pad 181. And in turn, SIF/Right Audio/SatQn signals may be output via output pad 186.

While details of terrestrial tuner 110 have been discussed above, understand that satellite tuner 150 may generally be configured similarly, namely to receive, process and downconvert satellite-based RF signals. As illustrated, LNAs 152, 154 may be configured to receive incoming satellite RF signals received via input pads $151_1$, $151_2$. In some implementations, LNAs 152, 154 may be configured to receive satellite RF signals from independent sources. In other cases, input pads $151_1$, $151_2$ may be shorted together and coupled to a common satellite source (e.g., a single satellite antenna) to provide greater performance such as improved noise performance (albeit at the expense of greater power consumption) by providing a single RF input to both LNAs 152, 154. In other cases, LNAs 152, 154 may be configured to operate as an input multiplexer, in which different satellite sources are provided to each of corresponding input pads $151_1$, $151_2$ that couple to LNAs 152, 154. In this way, during dynamic operation when a desired channel is present within an RF spectrum provided by a given source, that input pad 151 can couple to a corresponding powered up LNA, while the other LNA of the non-selected path may be tri-stated.

After amplification, the satellite RF signals are provided to a mixer 155, configured to perform downconversion with an LO clock signal received from a satellite frequency synthesizer 156. In various embodiments, frequency synthesizer 156 may have an integer N architecture with a variable frequency VCO and integer dividers. In many cases, as only one of receivers 110 and 150 is in operation at a given time, there may be no concern regarding coupling between the VCOs adapted on semiconductor die 100.

As described further below, in some cases receiver 100 may be stacked or included in a package with another similar such receiver. In such cases, care may be taken to ensure that there is no magnetic coupling between LC tanks of multiple LC VCOs (such as the terrestrial frequency synthesizers of separate die, as will be described further below). In one example, terrestrial frequency synthesizer 140 may be configured to operate with a LC VCO that is to operate at a fixed frequency that can be chosen in the range from approximately 16.5 gigahertz (GHz) to 17.5 GHz to avoid coupling to another die. The different LO frequencies for this synthesizer can be generated by changing only the interpolative divider ratios. Stated another way, tuning range requirements for this LC VCO are so low that a substantially constant VCO frequency can generate LO frequencies through the use of interpolator dividers. In other words, all the tuning range requirement stems from an ability to separate VCO frequencies of different die to address VCO coupling issues. And, as an example, satellite frequency synthesizer 156 may be configured to operate with a VCO tuning range of between approximately 5.7 GHz to 8.6 GHz, where this frequency range is divided by 4 or 8 LO to generate quadrature LO signals to cover the 950 MHz to 2150 MHz satellite TV band. The frequency of this VCO changes to generate different LO frequencies.

Further to prevent coupling between multiple closely located die, a terrestrial frequency synthesizer of another die may have a LC VCO that is to operate at a fixed frequency that is separated by between approximately 0.5-1.0 gigahertz (GHz) (where one VCO may operate at 16.5 GHz and the other may operate at 17.5 GHz). As such these LC VCOs of different die may be controlled to operate at substantially separated frequencies as compared to video channel bandwidth (e.g., 6-8 megahertz (MHz)), although with respect to nominal frequency, they are separated by a small percentage.

After downconversion in mixer 155, the resulting baseband signals are provided to PGAs $158_1$, $158_2$ for gain control and filtering. Thereafter, the signals are provided to ADCs 145a, 145b. As such, these signals proceed through the further signal processing paths of receiver 100 as described above. Understand while shown with this particular implementation in the embodiment of FIG. 1, many variations and alternatives are possible.

This is the case, as receiver 100 provides an architecture that is highly modular and can be flexibly incorporated into a wide variety of systems seeking use of a receiver for different TV and radio implementations. As such, a receiver in accordance with an embodiment can be adopted in a wide variety of systems such as set top boxes, televisions, entertainment systems, in addition to a wide variety of computing systems, ranging from client computing systems, mobile computing systems, multimedia computer systems and so forth. In addition, different embodiments may incorporate portions of the components shown in FIG. 1. For example, in some cases, a tuner-based arrangement may be provided in which the demodulators are not included. As such, a common tuner design can be provided for incorporation into different integrated circuits to target different market segments. In yet other cases, one or more particular demodulators may be incorporated, while other demodulators as shown in FIG. 1 may not be present in a particular implementation.

Figure 2A:
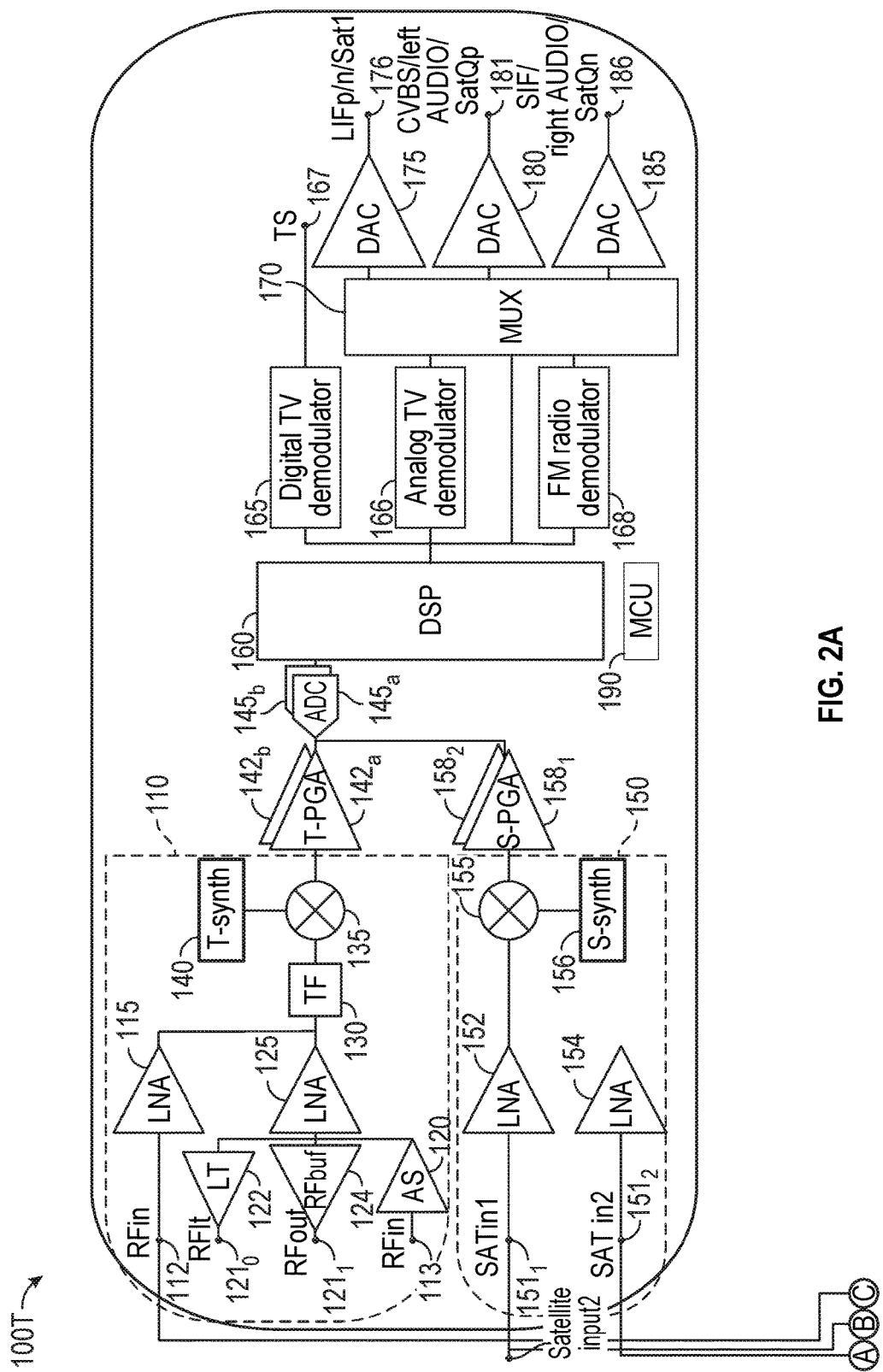
FIGS. 2A and 2B are block diagrams of a representative entertainment system including multiple receivers in accordance with an embodiment.
Figure 2B:
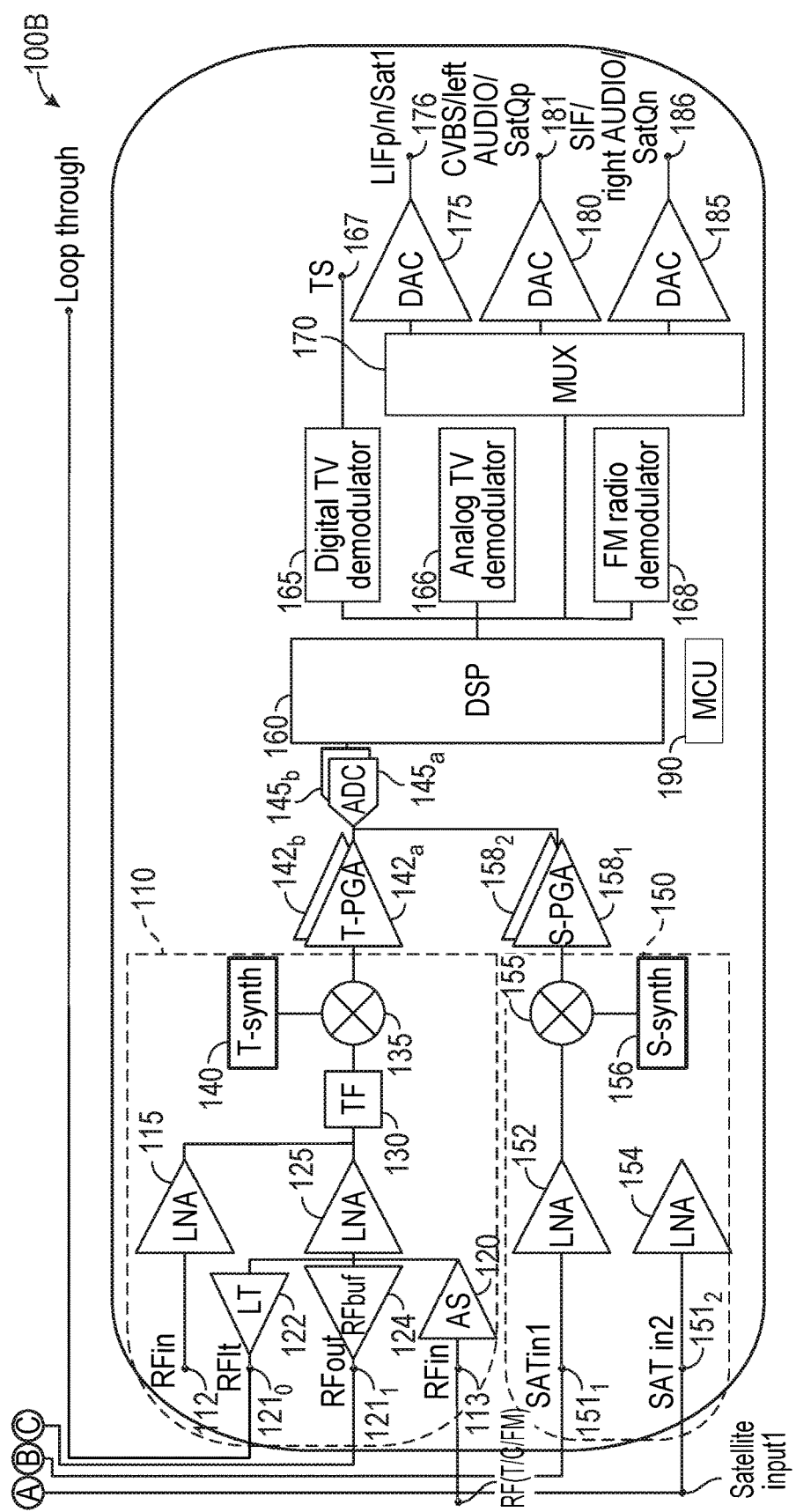

Still further, in some embodiments a given system may incorporate multiple receivers to provide for multi-source, multi-channel operation. To this end, referring now to FIGS. 2A and 2B, shown are block diagrams of a representative entertainment system 200 including multiple receivers in accordance with an embodiment. As shown in FIGS. 2A and 2B, entertainment system 200, which may, in different implementations, be a set top box, TV or other device, includes multiple receivers 100 referred to as receivers 100T and 100B. In one embodiment, receiver 100T may be implemented as a single semiconductor die, and receiver 100B similarly implemented as a separate single semiconductor die. In an embodiment, these receivers may be implemented within a single IC, such as a multi-chip module (MCM). In a particular embodiment, the die may be stacked upon each other, such that die 100B is a bottom semiconductor die adapted on a package substrate and receiver 100T is a top semiconductor die. In other cases, receivers 100T and 100B may be located next to each other within a single package or multiple packages. To enable appropriate interconnection and packaging, a given encapsulant may be interposed between the die to allow packaging and structural integrity of connections between the different die and bond wires connecting to pads or pins of the IC itself.

In embodiments having a stacked arrangement or closely located separate receivers on multiple die, by providing a fixed frequency VCO synthesizer implementation, magnetic coupling concerns between terrestrial synthesizer-based VCOs can be resolved. More specifically, to avoid magnetic coupling between these different LC tank VCOs, each can be configured to operate at a substantially separated fixed frequency. As one example, frequency synthesizer 140 of first receiver 100T may be configured at a fixed frequency of 16.5 gigahertz (GHz), while frequency synthesizer 140 of second receiver 100B may be configured at a frequency of 17.5 GHz. Understand while this example describes a substantial frequency separation of 1 GHz, other examples are possible. For example, in different implementations the frequency separation between the frequency of the multiple frequency synthesizers may be at other substantially separated frequencies.

Note that an incoming TV antenna/cable source is coupled to input pad 113 of bottom die 100B, which in turn couples to active splitter 120. As illustrated, the outputs of active splitter 120 couple to LNA 125 of bottom die 100B and buffers 122, 124. Buffer 122 provides a loop through path, and buffer 124 provides an RF input to LNA 115 of top die 100T. In some embodiments, the loop through path may couple directly to a downstream device, e.g., a TV in an implementation in which system 200 is a set top box. In this mode of operation, LNA 115 of bottom die 100B may be powered down to reduce power consumption. Similarly, active splitter 120, buffers 122, 124, and LNA 125 of top die 100T also may be powered down.

As further illustrated in FIGS. 2A and 2B, two satellite sources are provided, with each source coupling via given input pads $151_1$, $151_2$ to corresponding LNAs 152, 154 of both die 110T, 100B. In an embodiment, these connections may be made by providing a double bonding of satellite input pads 151 to given pins of an IC or other package. With this configuration, LNAs 152, 154 provide an analog input multiplexing function. With this multiplexing capability, each receiver 100 can tune to a different channel carried by the same signal source (e.g., satellite source). In other cases when this feature is not to be used and each receiver 100 is coupled to receive an independent (and single) satellite source, as previously discussed both LNAs 152, 154 of each die can be coupled together to the same source to provide for enhanced performance. Or, only a single one of these LNAs may be powered to enable reduced power consumption.

In some cases on the output side, output pads 167, 176, 181 and 186 of both die can be coupled together to the same pin of the IC. As one example, if a single analog TV demodulator 166 is to be used at a given time, CVBS pad 181 of both die may be coupled to the same output pin. Similarly, SIF pad 186 of both die also can be coupled to a single pin, to allow multiplexing. In this way, one die may have an active demodulator, while the output from the die that is not active can be tri-stated. In other embodiments, where demodulated outputs from both die may be used concurrently, this bonding together of the output pads may not occur.

With this stacked arrangement, RF signals are connected for a dual terrestrial tuner with one terrestrial antenna and a dual satellite tuner with RF input multiplexer capability. For dual terrestrial operation, one example configuration is with bottom die 100B to receive an RF signal via amplifier 120 from pad 113. Amplifier 125 is enabled as the LNA of the first terrestrial tuner and amplifier 115 is disabled. Buffer 124 is enabled and drives pad 121, which eventually is connected to pad 112 of top die 100T. In turn, on top die 100T, amplifier 115 has an input connected to pad 112 enabled as the LNA of the second terrestrial tuner. Amplifier 125 and amplifier 113 of top die 110T are disabled.

Still further implementations are possible. For example, more than two TV channels can be tuned simultaneously by providing at least one more receiver die within a given system. In some cases, a third die can be coupled to receive an incoming RF signal, e.g., via the loop through path as shown in FIGS. 2A and 2B. In other cases, such as where a less performance-significant tuner is to be included, instead of losing this loop through connection, a given signal source can be provided to this third tuner via another active splitter (such as active splitter 120 of this third die) can be used to allow a loop through path to be maintained. Other configurations and implementations are possible in other embodiments.

Figure 3:
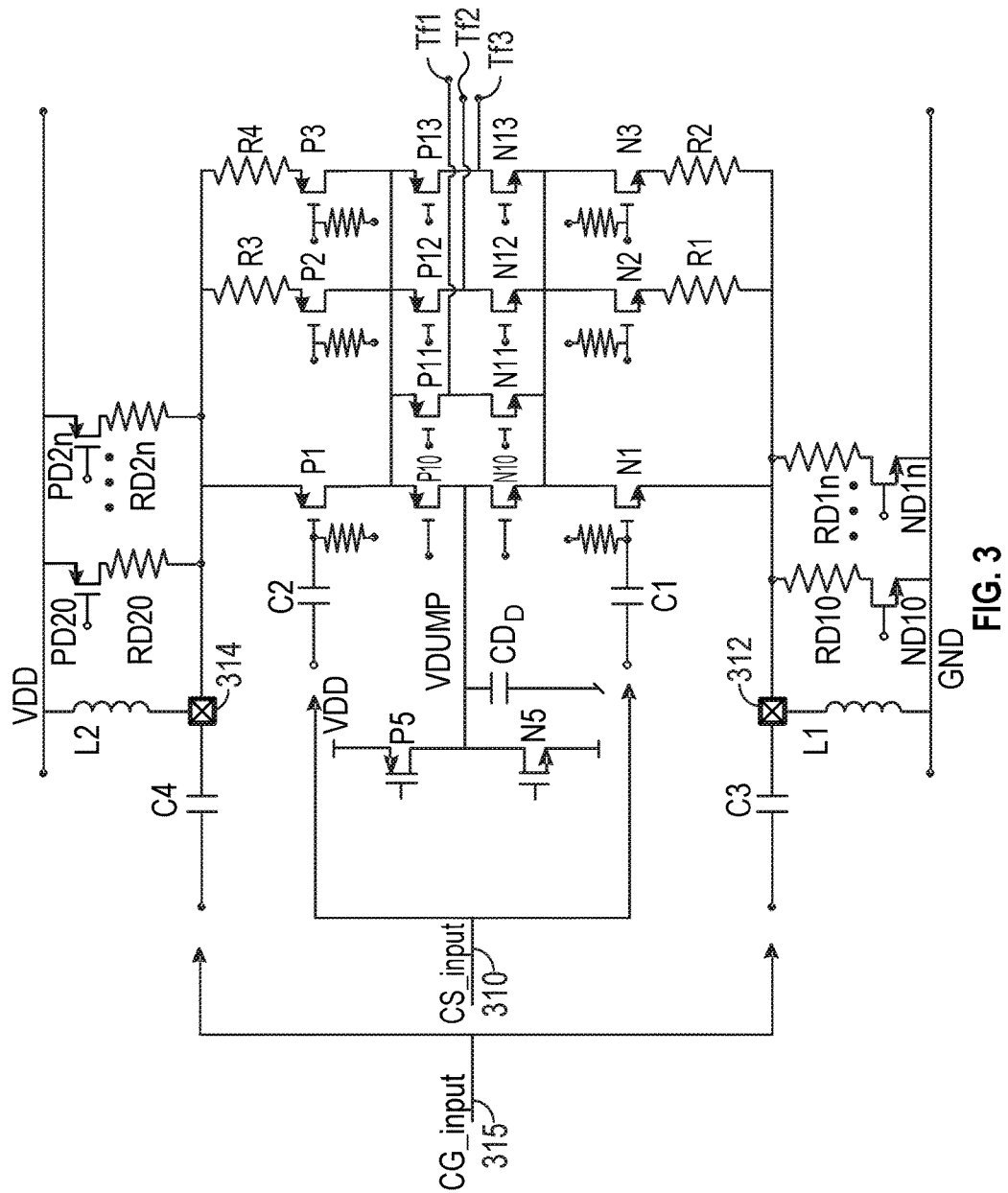
FIG. 3 is a schematic diagram of a configurable low noise amplifier in accordance with an embodiment.

Referring now to FIG. 3, shown is a schematic diagram of a configurable low noise amplifier in accordance with an embodiment. As shown in FIG. 3, LNA 300 is a configurable LNA that can be controlled, e.g., by an on-chip MCU, to operate as either a common source-based amplifier or a common gate-based amplifier, depending upon a type and source of an incoming RF signal. Understand that the illustration in FIG. 3 is of a single slice of an LNA, and in a particular implementation an LNA may be formed of a plurality of such slices, each similarly configured. As an example, an LNA may include 16, 32, 64 or another number of individual slices.

As illustrated, when an incoming signal is received via a common source input pad 310, the RF signal is AC coupled via coupling capacitors C1, C2 and provided to common source transistors N1, P1. In an embodiment, common source input 310 may be active when an incoming signal is received via an active splitter, as described above. As illustrated, these transistors may be implemented as metal oxide semiconductor field effect transistors (MOSFETs), more specifically, N-channel MOSFETs and P-channel MOSFETs (NMOS and PMOS, respectively). Thus in this common source configuration the input RF signal couples through the gate terminal of NMOS N1 and PMOS P1 and is output via drain terminals of these devices to a selected one of corresponding pair of cascode devices N10-N13, P10-P13.

More specifically, a selected one of these cascode pairs is enabled to provide the current output to a desired one of multiple tracking filters (not shown in FIG. 3 for ease of illustration), depending upon frequency of the desired channel. As shown three output nodes TF1-TF3 are provided, each of which couples to a given tracking filter of a tracking filter bank. Depending upon frequency of the desired channel (e.g., based on band of operation), a selected one of cascode pairs N11, P11-N13, P13 is enabled. Note that the cascode devices may be used to programmably switch or direct the amplified current based on a selected band of operation (e.g., UHF, VHFH, and VHFL).

Instead it is also possible that the current contribution of a given slice is not to be provided to a tracking filter, for gain control purposes. In such instance, instead cascode pair N10, P10 is enabled to allow the current output by common source amplifiers N1, P1 to be provided to a dump node (Vdump). As illustrated, this dump node couples to a pair of transistors N5, P5 and a dump capacitor $C_D$. Such cascode devices, by alternate provision to a dump node, can be used to provide programmable gain control for a given slice.

Note further that when configured for common source operation, a selectable amount of degeneration resistance can be coupled to the corresponding source terminals of transistors N1, P1. More specifically as shown, one or more of degeneration resistors RD10-RD1N can be coupled to NMOS N1 (via appropriate control of switches ND10-ND1N). Similarly, one or more of degeneration resistors RD20-RD2N can be coupled to PMOS P1 (via appropriate control of switches PD20-PD2N). When enabled, these degeneration resistors couple in parallel with an off-chip inductor L1, L2, respectively coupled to pads 312, 314. Such inductors are configured in this common source mode to reduce supply voltage headroom requirements. By providing this controllable source degeneration in the common source configuration a required amount of linearity can be programmably achieved. In this way, noise figure and linearity may be programmably traded off by way of control of the degeneration resistors.

Instead when configured for common gate operation when an incoming RF signal is received via common gate input 315, transistors N1, P1 may be controlled to be common gate-based transistors (by appropriate DC biasing of their corresponding gate terminals). In this common gate mode of operation, the incoming RF signal is AC coupled through capacitors C3, C4 (which as illustrated may be off-chip capacitors, in an embodiment).

The incoming RF signal couples to one or more common gate-configured amplifier pairs or legs. More specifically, depending upon gain requirements (versus noise considerations) one or more of amplifier legs formed of NMOSs N1-N3 and PMOSs P1-P3 may be enabled. Such selection of active amplifier legs in this common gate mode can be controlled by appropriate biasing of the gate terminals of NMOSs N1-N3 and PMOSs P1-P3. In the common gate configuration, note that the controllable degeneration resistors RD may be disabled, such that transistors N1 and P1 provide a low impedance path, while degeneration resistors R1-R4 couple to amplifiers N2-N3, P2-P3. In an embodiment, these degeneration resistors may be differently sized. For example, resistors R1, R3 may be, e.g., four times as large as resistors R2, R4. Further, by enabling different legs with different degeneration resistors, input impedance of the common-gate LNA can be programmed. This enables input matching versus noise figure trade off, such that better input matching can be realized for cable applications and better noise figure realized for terrestrial TV applications.

As with the common source configuration, in the common gate mode the resulting current output by one or more of the amplifier legs can be provided via cascode devices to a selected tracking filter (or the dump node). Note that in the common gate mode, inductors L1, L2 provide a high impedance at RF frequency, such that the input voltage in the common gate mode is directed to the selected amplifier legs. Understand while shown at this high level in the embodiment of FIG. 3, many variations and alternatives are possible.

Note that while the selection of common gate or common source mode (and number of active amplifier legs in common gate mode) may be globally controlled among slices, each slice may be individually controlled to provide an amplified current to the selected tracking filter or dump node. For example, in a cable mode of operation, the amplifier leg including NMOS N2 and PMOS P2 (and which may have a lower-value degeneration resistor) may be disabled and the current in the amplifier leg formed of NMOS N3 and PMOS P3 may have a higher input impedance to meet cable requirements.

Figure 4:
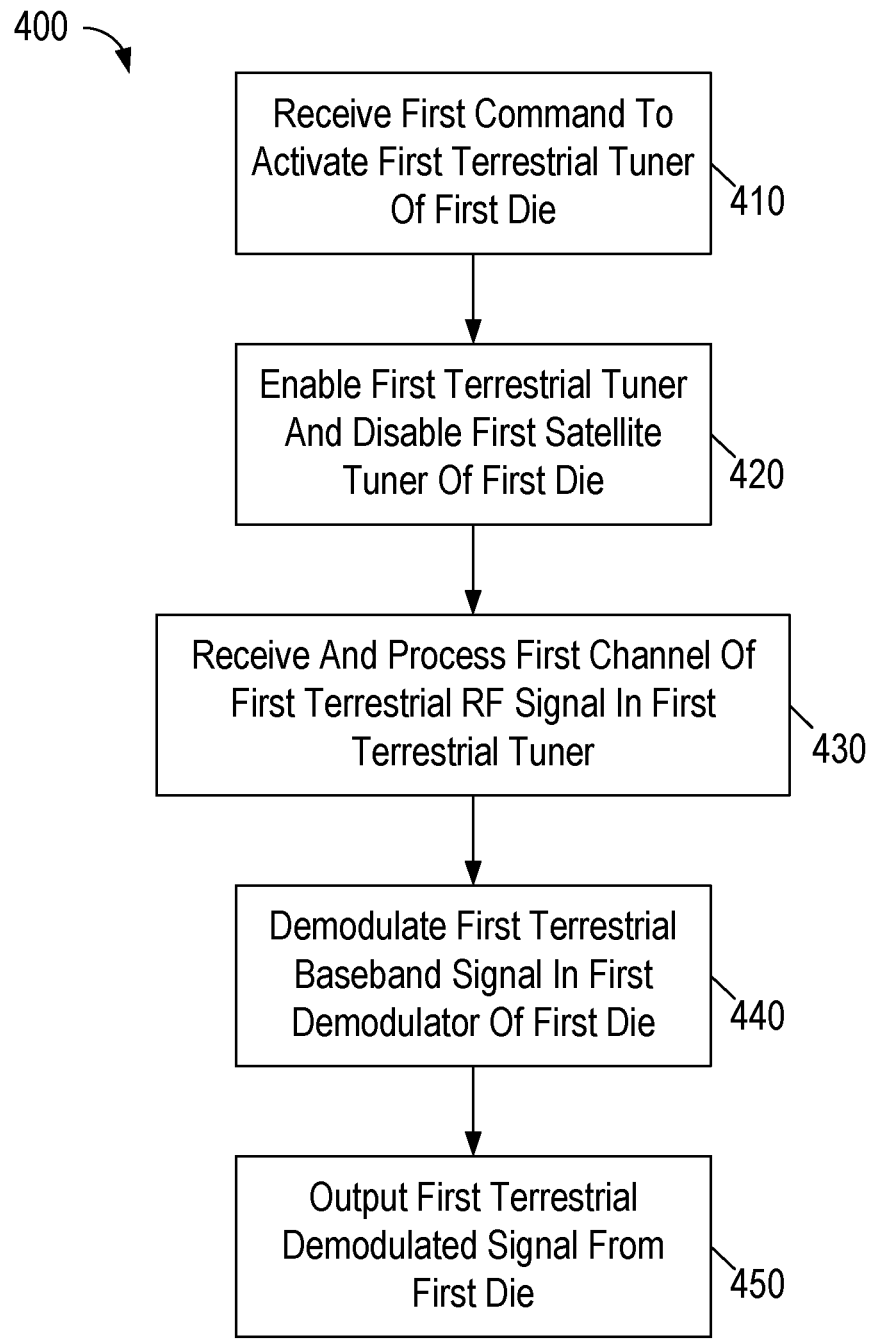
FIG. 4 is a flow diagram of a control method for a receiver in accordance with an embodiment.

Referring now to FIG. 4, shown is a flow diagram of a control method for a receiver in accordance with an embodiment. In the embodiment of FIG. 4, method 400 may be performed by a controller circuit, such as an MCU of a receiver configured with instructions stored in a non-transitory storage medium that when executed enable the microcontroller to configure the receiver for execution in a given mode according to the method of FIG. 4.

As illustrated, method 400 begins by receiving a first command to activate a first terrestrial tuner of a first semiconductor die (block 410). In a given receiver implementation, this command may be received from a host processor of a system such as a given entertainment system. Responsive to receipt of this command, at block 420 the controller may enable the first terrestrial tuner and disable a first satellite tuner of the first die such as by control of appropriate switches along the signal processing paths. That is, in a receiver as described herein where multiple tuners share at least some front end circuitry, only one of a given satellite tuner and terrestrial tuner may be enabled at a given time.

Note that enabling the first terrestrial tuner in block 420 may include configuring the LNA of the terrestrial tuner appropriately. As discussed herein, depending upon a particular receiver implementation, this LNA can be configured as a common gate LNA that receives a terrestrial RF signal directly from an input pad. In other cases, a receiver may be implemented such that this LNA is configured as a common source LNA, which receives the incoming RF signal via an active splitter so that the RF signal can further be provided to other locations, such as to another die of the receiver in a multi-die implementation and/or to a loop through destination, such as a connection to a television or other output device.

Understand that while FIG. 4 shows operations for enabling operation of a first terrestrial tuner, in some cases a similar command can be received to also enable a terrestrial tuner of another die of the receiver, such that both terrestrial tuners may operate concurrently. In such cases, one tuner may be configured to receive and process a first TV channel, while the other tuner is configured to receive and process another channel, such that multiple TV outputs can be provided, e.g., to a single display or multiple displays, or one output can be provided to a TV and a second output can be provided to another destination, such as a personal video recorder (PVR) of the entertainment system. Of course other downstream uses of a signal are possible.

Still referring to FIG. 4, after appropriate configuration, control passes to block 430 where a first channel of this first terrestrial RF signal can be received and processed in the first terrestrial tuner, as described herein. At block 440 the first terrestrial baseband signal can be demodulated in a first demodulator of the receiver. Depending upon the type of incoming signal, this demodulator may be a given one of an analog demodulator or a digital demodulator. Next at block 450 the first terrestrial demodulated signal can be output from the first die. This signal can be provided, e.g., through one or more digital-to-analog converters of the die and sent out as a TV signal when the incoming signal is an analog signal. Instead where a digital demodulator is used, the demodulated TV signal can be digitally output as a transport stream, e.g., to be provided to a given decoder. In other cases, understand that commands instead may be received to disable the demodulators and output digital modulated signals via the DACs as modulated signals to be provided to a given destination. Of course many other examples of receiving incoming commands from a host processor and configuring and operating a receiver via an internal controller as described herein are possible.

Figure 5:
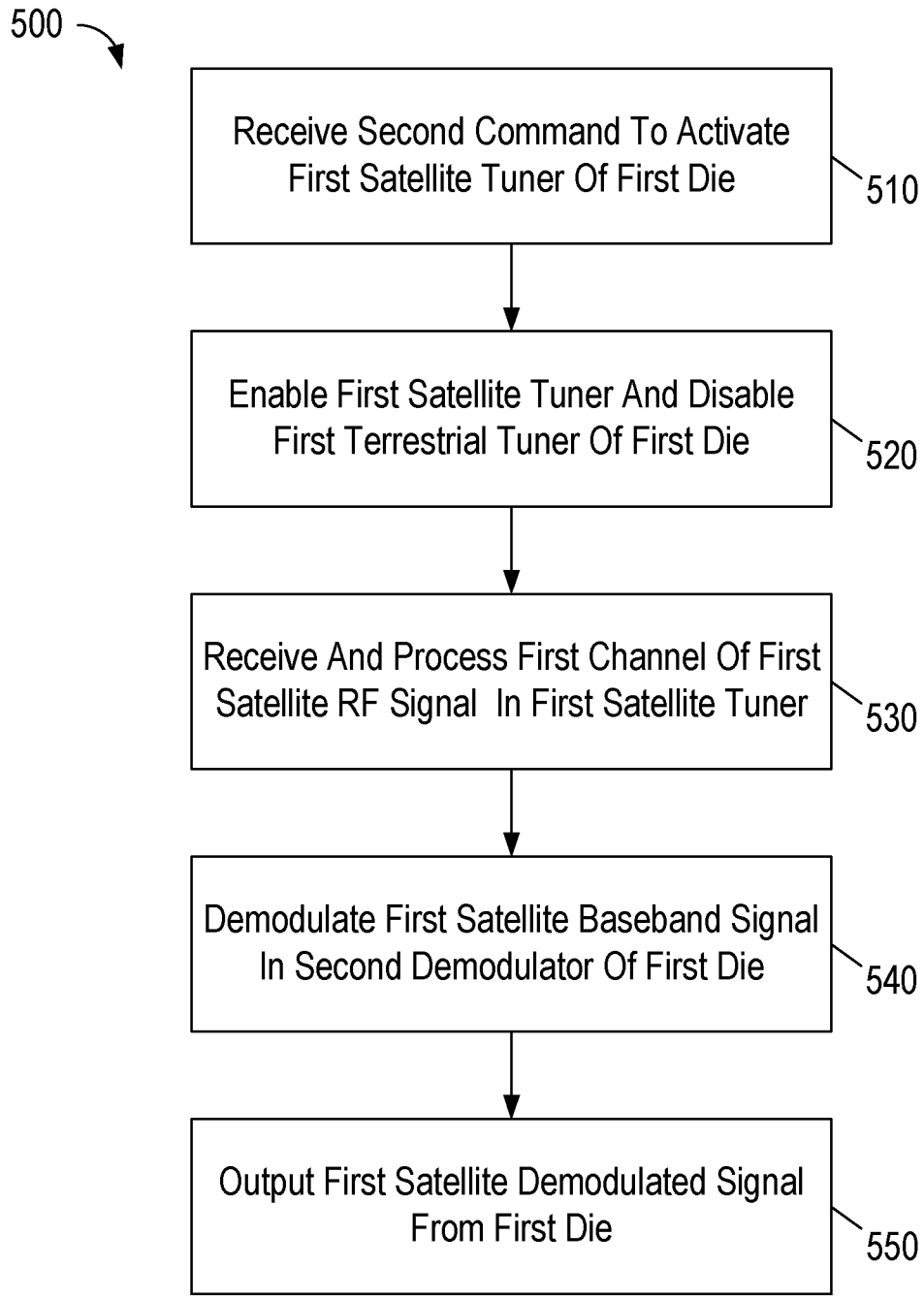
FIG. 5 is a flow diagram of a control method for a receiver in accordance with another embodiment.

Referring now to FIG. 5, shown is a flow diagram of a control method for a receiver in accordance with another embodiment. In the embodiment of FIG. 5, method 500 may be performed by a MCU or other controller circuit. As illustrated, method 500 begins by receiving a second command to activate a first satellite tuner of the first semiconductor die (block 510). Assume this command is received sometime after the first command of FIG. 4, such as when a user desires to switch to a satellite-based channel. As above, this command may be received from a system host processor. Responsive to receipt of this command, at block 520 the controller may enable the first satellite tuner and disable the first terrestrial tuner of the first die.

This enabling of the first satellite tuner in block 520 may include configuring the LNA of the satellite tuner appropriately. As discussed herein, depending upon a particular receiver implementation, one or two LNA paths can be activated, depending, e.g., on noise and/or power considerations (and/or desire for input multiplexer).

Still referring to FIG. 5, after appropriate configuration, control passes to block 530 where a first channel of this first satellite RF signal can be received and processed in the first satellite tuner, as described herein. At block 540 the first satellite baseband signal can be demodulated in a second (e.g., digital) demodulator of the receiver. Next at block 550 the first satellite demodulated signal can be output from the first die. This signal can be provided via a transport stream output of the die, e.g., to be provided to a given decoder.

Understand while shown with these particular modes of operation and switching of control between the different tuners of one or more die is shown, many variations and alternatives are possible. Furthermore, while specific transitions between the different modes of operation are described above, it is possible for many other transitions between the modes described above and other modes to occur. As examples, multiple terrestrial tuners adapted on different die can operate concurrently (processing one or more input RF signals). Or multiple satellite tuners adapted on different die can operate concurrently (processing one or more input RF signals). Or terrestrial and satellite tuners adapted on different die can concurrently and independently process different incoming RF signals. Still further, while specific representative tuners to process given RF signals from given antennas have been discussed above, understand that such selection is arbitrary, and a given programming of an MCU or other control logic with programmable instructions stored in a non-transitory storage medium may call for the operation to be performed by different tuners and demodulators or combinations of tuners and demodulators. And while the above examples relate to TV and radio bands, embodiments apply equally to tuners and control logic configured for additional RF bands.

Figure 6:
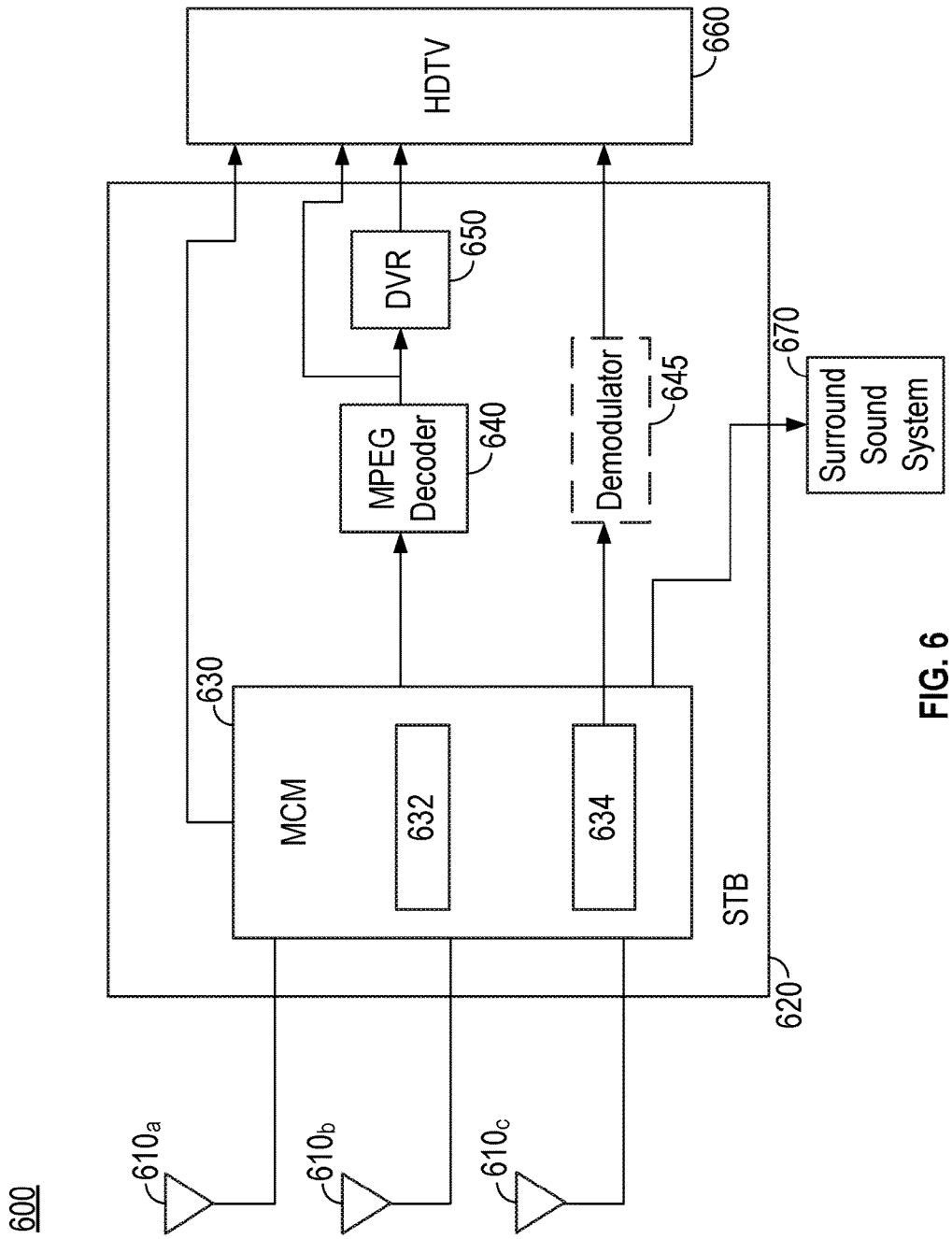
FIG. 6 is a high-level block diagram of an entertainment system in accordance with an embodiment.

Referring now to FIG. 6, shown is a high-level block diagram of an entertainment system in accordance with an embodiment. As shown in FIG. 6, entertainment system 600 may form all or part of a home entertainment system, as an example. Incoming RF signals of different bands may couple via one or more of antennas 610a-610c to a set-top box 620. In other cases, RF signals instead may be received via a cable connection (not shown for ease of illustration in FIG. 5).

The incoming signals are provided to a multichip module receiver 630, which may incorporate multiple die 632, 634 as described herein to enable a wide range of flexibility and operation according to various standards for any or all of cable, satellite and/or terrestrial-received content. In turn, processed signals (which may take the form of a MPEG transport stream, demodulated signals or undemodulated signals (as well as a loop through path)) may be output from MCM receiver 630 to various locations. Specifically as shown in FIG. 6, an MPEG transport stream may be provided to an MPEG decoder 640 that in turn may provide decoded TV signals both to a television such as a high definition TV 660 and a digital video recorder (DVR) 650. Similarly, demodulated signals output by MCM receiver 630 may couple, e.g., to HDTV 660 and/or a surround sound system 670. In other cases in which one or more on-chip demodulators are bypassed, a demodulator 645 optionally may be present within set-top box 620 to perform further demodulation operations. In addition, in a loop through mode of operation, loop through signals may be sent directly from MCM receiver 630 to, e.g., HDTV 660 for processing therein. Understand while shown at this very high level in the example of FIG. 6, a multi-standard expandable TV/satellite/radio receiver as described herein can be incorporated into a wide variety of different systems.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a semiconductor die including:
  a first tuner to receive and tune a terrestrial radio frequency (RF) signal, the first tuner including a first frequency synthesizer including a first voltage controlled oscillator (VCO) to generate a first VCO signal at a first frequency, and a first mixer to downconvert the terrestrial RF signal to a terrestrial baseband signal using the first VCO signal;
  a second tuner to receive and tune a satellite RF signal, the second tuner including a second frequency synthesizer including a second VCO to generate a second VCO signal at a second frequency, and a second mixer to downconvert the satellite RF signal to a satellite baseband signal using the second VCO signal;
  a digitizer coupled to the first and second tuners to digitize the terrestrial baseband signal and the satellite baseband signal;
  a digital signal processor (DSP) to further process the terrestrial baseband signal and the satellite baseband signal;
  a first demodulator to demodulate the terrestrial baseband signal and output a demodulated terrestrial signal;
  a second demodulator to demodulate the satellite baseband signal and output a demodulated satellite signal; and
  a bypass path to bypass the first and second demodulators and to provide at least one the terrestrial baseband signal and the satellite baseband signal from the DSP to an output pad of the semiconductor die.

2. The apparatus of claim 1, further comprising a third demodulator to demodulate a baseband frequency modulated (FM) signal, the baseband FM signal generated by the first tuner.

3. The apparatus of claim 1, wherein the first tuner comprises:
  a first low noise amplifier (LNA) to receive and amplify the terrestrial RF signal; and
  a second LNA to receive and amplify a second terrestrial RF signal.

4. The apparatus of claim 3, further comprising an active splitter to receive the second terrestrial RF signal and provide the second terrestrial RF signal to the second LNA and to at least one buffer to output the second terrestrial RF signal from the semiconductor die.

5. The apparatus of claim 4, wherein the at least one buffer comprises a first buffer and a second buffer, wherein the second buffer comprises a loop through buffer to output the second terrestrial RF signal to a second semiconductor die coupled to the semiconductor die.

6. The apparatus of claim 3, further comprising a configurable LNA, wherein the configurable LNA is controllable to be the first LNA in a first mode of operation and to be the second LNA in a second mode of operation.

7. The apparatus of claim 6, wherein the first LNA comprises a common gate amplifier and the second LNA comprises a common source amplifier.

8. The apparatus of claim 6, wherein the configurable LNA includes a plurality of slices, each of the plurality of slices individually controllable to provide an output to one of a plurality of filters coupled to the first mixer or to a dump node.

9. The apparatus of claim 8, wherein a first slice comprises:
  a first amplifier pair controllable to operate in a selected one of a common gate mode and a common source mode;
  a plurality of cascode pairs, wherein one of the plurality of cascode pairs is to be coupled to the first amplifier pair to direct an amplified output of the first amplifier pair to a selected destination corresponding to one of the plurality of filters or the dump node; and
  at least second and third amplifier pairs controllable to operate in the common gate mode.

10. The apparatus of claim 1, wherein the second tuner comprises:
  a first low noise amplifier (LNA) to receive and amplify the satellite RF signal; and
  a second LNA to receive and amplify a second satellite RF signal.

11. The apparatus of claim 10, further comprising a microcontroller, wherein in a first mode the microcontroller is to cause the satellite RF signal to couple to the first and second LNAs.

12. The apparatus of claim 1, wherein the first frequency synthesizer comprises a first plurality of interpolative dividers to receive the first VCO signal and generate a plurality of local oscillator (LO) clock signals including a first LO clock signal therefrom, and the second frequency synthesizer comprises a plurality of integer dividers to receive the second VCO signal and generate a second LO clock signal therefrom, the first mixer to receive the first LO clock signal and the second mixer to receive the second LO clock signal.

13. The apparatus of claim 1, wherein the apparatus comprises an integrated circuit (IC) comprising:
  the semiconductor die; and
  a second semiconductor die stacked above the semiconductor die without shielding therebetween, the second semiconductor die including a third tuner, a fourth tuner, and a second DSP and at least one demodulator.

14. An apparatus comprising:
  a first semiconductor die including:
    a first terrestrial tuner to receive and tune a terrestrial radio frequency (RF) signal, the first terrestrial tuner including a first frequency synthesizer including a first voltage controlled oscillator (VCO) to generate a first VCO signal at a first frequency, and a first mixer to downconvert the terrestrial RF signal to a terrestrial baseband signal using the first VCO signal;
    a first satellite tuner to receive and tune a selected one of a satellite RF signal and a second satellite RF signal, the first satellite tuner including a second frequency synthesizer including a second VCO to generate a second VCO signal at a second frequency, and a second mixer to downconvert a selected one of the satellite RF signal and the second satellite RF signal to a satellite baseband signal using the second VCO signal;
    a digitizer coupled to the first terrestrial tuner and the first satellite tuner to digitize the terrestrial baseband signal and the satellite baseband signal;
    a digital signal processor (DSP) to further process the terrestrial baseband signal and the satellite baseband signal;
    a first analog demodulator to demodulate the terrestrial baseband signal and output a first demodulated terrestrial signal; and
    a first digital demodulator to demodulate the terrestrial baseband signal and output a second demodulated terrestrial signal, when the terrestrial baseband signal comprises a digital modulated signal, and to demodulate the satellite baseband signal and output a first demodulated satellite signal; and
  a second semiconductor die stacked above the first semiconductor die, the second semiconductor die including:
    a second terrestrial tuner to receive and tune the terrestrial RF signal, wherein the second terrestrial tuner is to receive the terrestrial RF signal from the first terrestrial tuner of the first semiconductor die;
    a second satellite tuner to receive and tune a selected one of the satellite RF signal and the second satellite RF signal;
    a second digitizer coupled to the second terrestrial tuner and the second satellite tuner to digitize a terrestrial baseband signal and a satellite baseband signal; and
    a second DSP to further process the terrestrial baseband signal and the satellite baseband signal.

15. The apparatus of claim 14, further comprising a controller to cause the first terrestrial tuner to receive and tune to a first channel within the terrestrial RF signal and concurrently cause the second terrestrial tuner to receive and tune to a second channel within the terrestrial RF signal.

16. The apparatus of claim 15, wherein the controller is to cause a first amplifier of the first satellite tuner to be enabled to receive and amplify the satellite RF signal and cause a second amplifier of the first satellite tuner to be disabled, and to cause the first terrestrial tuner to be disabled while the first satellite tuner is enabled.

17. A non-transitory computer-readable medium including instructions that when executed enable a system to perform operations comprising:
  receiving a first command from a host controller in a controller of a receiver, the first command to request activation of a first terrestrial tuner of the receiver;
  enabling the first terrestrial tuner and disabling a first satellite tuner of the receiver, the first terrestrial tuner and the first satellite tuner formed on a first semiconductor die, the first terrestrial tuner having a first frequency synthesizer to operate at a first fixed frequency and the first satellite tuner having a second frequency synthesizer to operate at a second frequency;

configuring the first terrestrial tuner to receive and process a first terrestrial radio frequency (RF) signal of a first channel in the first terrestrial tuner;

configuring a first demodulator of the receiver to demodulate a first terrestrial baseband signal obtained from the first terrestrial RF signal, the first demodulator formed on the first semiconductor die; and configuring a selection circuit of the receiver to receive and output the first terrestrial demodulated signal from the receiver.

18. The computer-readable medium of claim 17, further comprising instructions that when executed enable the system to perform operations comprising:

configuring an amplifier of the first terrestrial tuner as a common gate amplifier when the first terrestrial RF signal is received via a first input pad; and configuring the amplifier of the first terrestrial tuner as a common source amplifier when the first terrestrial RF signal is received via a second input pad, the second input pad coupled to an active splitter, wherein an output of the active splitter is coupled to an input of the amplifier, the output of the active splitter further to provide the first terrestrial RF signal from a first output pad to couple to a different terrestrial tuner.

19. The computer-readable medium of claim 17, further comprising instructions that when executed enable the system to perform operations comprising:

receiving a second command from the host controller in the controller, the second command to request activation of the first satellite tuner of the receiver;

enabling the first satellite tuner and disabling the first terrestrial tuner;

configuring a first amplifier of the first satellite tuner to receive a first satellite RF signal in a first mode; and configuring the first amplifier and a second amplifier of the first satellite tuner to receive the first satellite RF signal in a second mode.

* * * * *